A. A. REMINGTON.
MEANS OF CONNECTION BETWEEN CANTALIVER SPRINGS OF VEHICLES AND THE AXLES THEREOF.
APPLICATION FILED OCT. 5, 1914.

1,172,557.

Patented Feb. 22, 1916.
2 SHEETS—SHEET 1.

Witnesses.
Mary G. Brooks
Harry King

Inventor.
Alfred Arnold Remington.
By Frank Chase Jones,
Attorney.

A. A. REMINGTON.
MEANS OF CONNECTION BETWEEN CANTALIVER SPRINGS OF VEHICLES AND THE AXLES THEREOF.
APPLICATION FILED OCT. 5, 1914.

1,172,557.

Patented Feb. 22, 1916.
2 SHEETS—SHEET 2.

Witnesses.
Mary Y. Brooks.
Harry King.

Inventor
Alfred Arnold Remington.
By Frank Chase Somes,

Attorney.

UNITED STATES PATENT OFFICE.

ALFRED ARNOLD REMINGTON, OF BIRMINGHAM, ENGLAND.

MEANS OF CONNECTION BETWEEN CANTALIVER-SPRINGS OF VEHICLES AND THE AXLES THEREOF.

1,172,557.  Specification of Letters Patent.  Patented Feb. 22, 1916.

Application filed October 5, 1914. Serial No. 865,189.

*To all whom it may concern:*

Be it known that I, ALFRED ARNOLD REMINGTON, a subject of the King of Great Britain, and residing at Birmingham, in the county of Warwick, England, engineer, have invented certain new and useful Improvements in the Means of Connection Between Cantaliver-Springs of Vehicles and the Axles Thereof, of which the following is a specification.

This invention relates to duplex safety connections between the cantaliver springs of vehicles and the axles thereof.

The invention comprises a duplex connection between a cantaliver leaf spring and axle including a normal connection between a long plate or leaf of said spring and the axle, and an independent auxiliary connection between the outer portion of a shorter plate or leaf of said spring and the axle, the auxiliary connection being inoperative under normal conditions and in case of fracture of the long plate being operative to retain the axle in connection with the spring and to impart endwise tension thereto.

In carrying out the invention, one plate of the spring is connected with the axle as, or substantially as, heretofore, or in any convenient manner to effect the same or corresponding purpose, and another plate of the spring is independently connected at or near its other end with the axle in a manner which does not substantially affect the action of the spring in relation to the axle so long as the first-mentioned connection is normally operative, but which, if the plate with which the first-mentioned connection is made breaks, will retain the axle.

Figure 1:
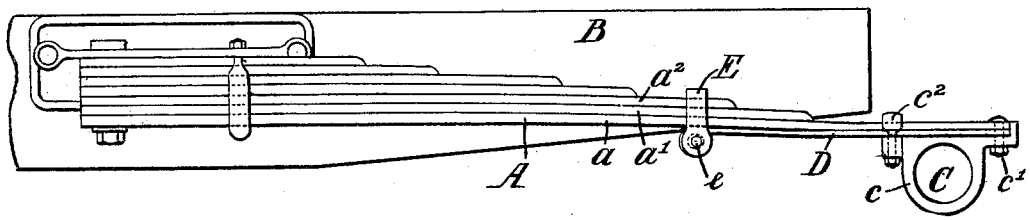
Figure 2:
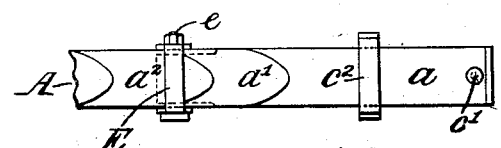
Figure 3:
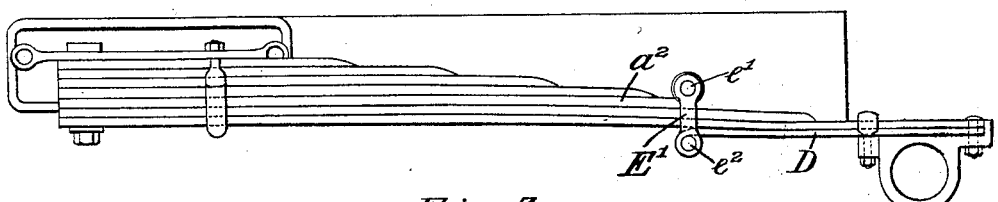
Figure 4:
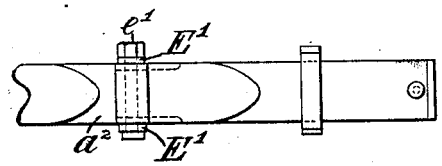
Figure 5:
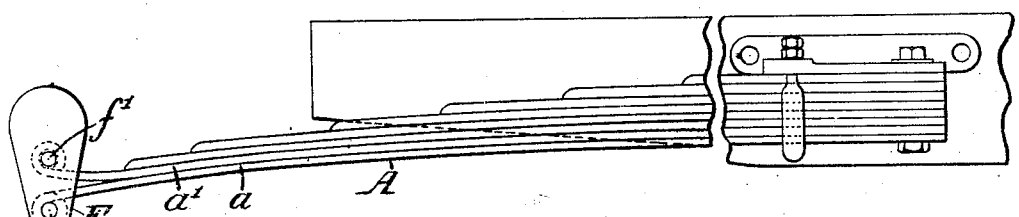
Figure 6:
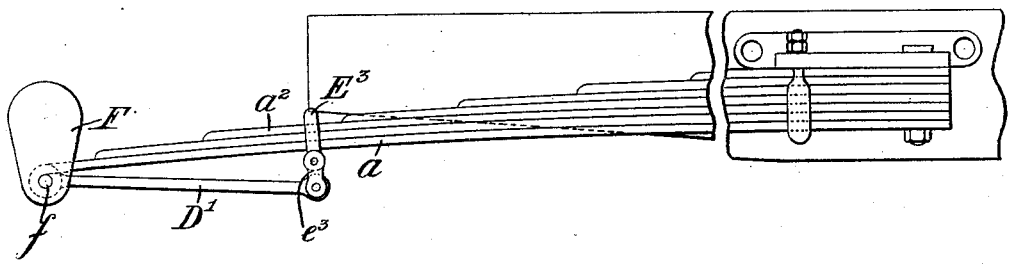
Figure 7:
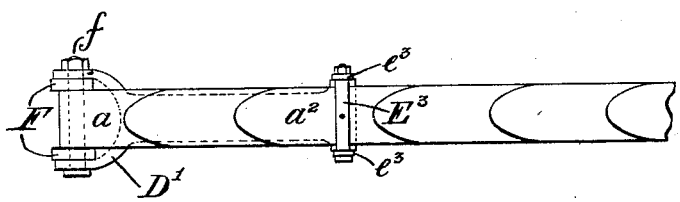

Referring to the accompanying drawings, Figure 1 shows, in side elevation, a means of carrying out the invention which is particularly applicable in the case of a front axle. Fig. 2 is a plan view of as much of the outer end of the spring and its connections of which are shown by Fig. 1 as is necessary for the purpose. Fig. 3 shows, in side elevation, a somewhat modified form of the method shown by Fig. 1. Fig. 4 is a plan view of the outer end of the spring and its connections shown by Fig. 3. Fig. 5, shows, in side elevation, a further form of the invention which is particularly applicable in the case of a rear axle. Fig. 6 shows, in side elevation, a further form of the invention; and Fig. 7 is a plan view of the outer end of the spring and its connections as shown by Fig. 6.

Referring to Figs. 1 and 2:—The cantaliver spring A, which is fixed at its inner end to the frame B in the usual or any convenient manner, has a number of plates $a$ $a'$, etc., of the usual character, the longest plate $a$ being fixed, at its outer or free end, upon a bracket $c$ of the axle C. A plate D runs beneath the plate $a$ for some distance from its outer end and is itself rigidly connected with the axle by clamping it between the plate $a$ and the bracket $c$, by the bolt $c'$ and clip $c^2$ which fix the outer end of the plate $a$ to the bracket, the plate D being thus held up just underneath the plate $a$. This plate D is connected at its inner end with one of the shorter plates, namely, as shown, the plate $a^2$, through the medium of a clip E of the ordinary or any convenient form. If, as is shown, the inner end of the plate D is formed with an eye and is connected with the clip E by means of a bolt $e$ which passes through the sides of the clip, beneath the spring, and through such eye, the eye is formed with the hole therethrough of a slightly elongated shape and somewhat deeper than the diameter of the pin $e$ to allow free endway movement between the plate D and the spring, and insure that the ordinary action of the spring will not be substantially interfered with by the plate D. Should the plate $a$ fracture, the axle will remain connected with the spring through the medium of the plate D and clip E.

Referring now to Figs. 3 and 4:—The arrangement is the same as shown by Figs. 1 and 2, except that the plate D is connected with the plate $a^2$ through the medium of a pair of links $E^1$, the links being connected through the medium of a bolt $e'$, with an eye which is formed on the end of the plate $a^2$ and, through the medium of a bolt $e^2$, with an eye which is formed on the inner end of the plate D. In this form of the invention, the links $E^1$ will vibrate under the action of the spring and insure that such action will not be substantially interfered with by the plate D.

Referring now to Fig. 5:—The laminated cantaliver spring A is shown to be connected at its outer end to a lug or bracket F of a rear axle casing. The lowest plate $a$ of the spring is shown to be formed with an eye at its outer end and to be pivoted direct to the lug by means of a pin $f$, as usual, and the plate $a'$, which is the next thereabove, is of substantially the same length as the plate $a$ and is formed with an eye at its outer or free end which is also pivoted to the lug, but the opening of the eye of the plate $a'$, through which the pivot pin $f'$ passes, is of a diameter to allow clearance space around the pin and allow such movement of the plate $a'$ as will insure that its connection with the lug or bracket will not interfere with the ordinary action of the spring. Should the plate $a$ fracture, the axle will still remain connected with the spring, through the medium of its connection with the plate $a'$. Obviously, one of the other plates above the plate $a$ may be connected with the axle in the manner in which the plate $a'$ has been described as connected therewith, in lieu of connecting the plate $a'$ in such manner.

Referring now to Figs. 6 and 7:—These show an arrangement similar to that shown by Fig. 5, except that in lieu of directly connecting one of the plates which is above the plate $a$ with the lug or bracket F, one of these plates, namely, as shown, the plate $a^2$, is connected with the lug through the medium of a clip $E^3$, a pair of links $e^3$ depending from the lower end of the lug, and a link $D^1$ which connects between the lower end of the links $e^3$ and a pivot pin of the lug F, conveniently the pivot pin $f$ by which the outer end of the plate $a$ is connected with the lug. The end of the link $D^1$ is bifurcated or forked for connection with the pin $f$. Should the plate $a$ fracture, the axle will still remain connected with the spring, through the medium of the links $D^1$ and $e^3$. The link $D^1$ passes underneath the spring and will consequently prevent the end of the axle rising substantially in relation to the spring, notwithstanding fracture of the plate $a$.

It will now be seen that the invention is capable of considerable variation in detail.

Having fully described my invention, what I claim and desire to secure by Letters Patent, is:—

1. The combination, in a vehicle, of a body frame, an axle, a cantaliver spring connected at one end to said frame, means for connecting a long plate of said spring with said axle, and an independent auxiliary connecting means between the outer portion of a shorter plate of said spring and said axle, the auxiliary connection being inoperative under normal conditions and in case of fracture of the long plate being operative to retain the axle in connection with the spring and to impart endwise tension thereto.

2. The combination, in a vehicle, of a body frame, an axle, a cantaliver spring connected at one end to said frame, means for connecting a long plate of said spring with said axle, a guard plate connected with said axle and extending under the lowest plate of said spring, and a connector between the inner end of said guard plate and the outer portion of another plate of said spring.

3. The combination, in a vehicle, of a body frame, an axle, a cantaliver spring connected at one end to said frame, and having its lowest plate rigidly connected with said axle, a guard plate rigidly connected with said axle and extending under said lowest spring plate, and a connector uniting the free end of said guard plate with another plate of said spring at or near the outer or free end thereof.

4. The combination, in a vehicle, of a body frame, an axle, a cantaliver spring connected at one end to said frame and having its lowest plate connected with said axle, a guard plate disposed underneath the outer end of said spring, connected at its outer end to said axle and terminating at its inner end beneath a shorter plate of said spring, and a connector uniting the inner end of said guard plate with the outer end of said shorter spring plate.

5. The combination, in a vehicle, of a body frame, an axle, a cantaliver spring connected at one end to said frame, an axle bracket to which the lowest plate of said spring is connected, a guard plate rigidly connected with said bracket and extending under said spring to a point beneath the outer portion of a shorter plate thereof, and means connecting said guard plate with the outer portion of said shorter plate.

In witness whereof I have hereunto signed my name this 23rd day of September, 1914, in the presence of two subscribing witnesses.

ALFRED ARNOLD REMINGTON.

Witnesses:
ERNEST HARKER,
ROBERT G. GROVES.

Copies of this patent may be obtained for five cents each, by addressing the "Commissioner of Patents, Washington, D. C."